(12) United States Patent
Lien

(10) Patent No.: US 6,685,369 B2
(45) Date of Patent: Feb. 3, 2004

(54) HOUSING ASSEMBLY FOR MEMBRANE KEYBOARD

(76) Inventor: Andy Lien, 3F, No. 30, Lane 250, Chung-Cheng Rd., Pan-Chiao City, Taipei Hsien (TW)

( * ) Notice: Subject to any disclaimer, the term of this patent is extended or adjusted under 35 U.S.C. 154(b) by 40 days.

(21) Appl. No.: 10/006,232

(22) Filed: Dec. 10, 2001

(65) Prior Publication Data

US 2003/0108374 A1 Jun. 12, 2003

(51) Int. Cl.[7] .............................................. H01H 13/70
(52) U.S. Cl. ................ 400/472; 400/479.1; 400/479.2; 341/22; 345/168; 361/680
(58) Field of Search ........................... 361/680; 341/22; 345/168; 400/472, 491; 40/479.1, 479.2

(56) References Cited

U.S. PATENT DOCUMENTS

| | | | | | |
|---|---|---|---|---|---|
| 4,621,373 A | * | 11/1986 | Hodsdon | ................ | 455/90.3 |
| 5,219,291 A | * | 6/1993 | Fong et al. | ................ | 434/323 |
| 5,227,956 A | * | 7/1993 | Johnson et al. | ............. | 361/736 |
| 5,981,890 A | * | 11/1999 | Chen | ........................ | 200/515 |
| 6,028,591 A | * | 2/2000 | Lueders | ...................... | 345/156 |
| 6,542,355 B1 | * | 4/2003 | Huang | ........................ | 361/680 |

* cited by examiner

Primary Examiner—Andrew H. Hirshfeld
Assistant Examiner—Dave A. Ghatt
(74) Attorney, Agent, or Firm—Birch, Stewart, Kolasch & Birch, LLP

(57) ABSTRACT

A housing assembly in which is placed a membrane keyboard is placed between the pressing layer and the base support. Pressing labels and key zones are respectively printed on a surface of the membrane keyboard and on the pressing layer at corresponding locations. An image layer with image features can be further placed between the pressing layer and the membrane keyboard. The housing assembly hence constructed can be fashionable by changing the upper cover and/or image layer, while the membrane keyboard can be further used on leveled working surfaces.

9 Claims, 5 Drawing Sheets

HOUSING ASSEMBLY FOR MEMBRANE KEYBOARD

FIELD OF THE INVENTION

The invention provides a housing assembly in which a membrane keyboard can be mounted so that the membrane keyboard can be used on leveled working surfaces, while the housing assembly can be further easily fashionable.

BACKGROUND OF THE INVENTION

With respect to technologic products that are presently commercialized, consumer demands increasingly emphasize on products that can be conveniently carried. As a result, product design increasingly develops products with thinner, lighter, shorter, and smaller external aspect. However, some electronic products do not meet the above characteristics, and consumer demands for more easily portable products cannot be therefore satisfied.

In the market of keyboard products, the consumer can principally find three types of devices that are rigid keyboards, foldable keyboards, and membrane keyboards. "Rigid keyboards" refer to the conventional keyboards that are used in traditional personal computers or portable computers. The rigid keyboard conventionally comprises an upper and lower housing and, assembled within the upper and lower housing, a circuit board, keypads made of plastics, and key caps. After the above component parts are assembled with one another, the hence-formed rigid keyboard is substantially voluminous and heavy, and cannot be further accommodated in a more convenient form. Contrasting with mobile and easily portable telecommunication devices such as mobile phones, the use of the rigid keyboard is therefore limited to specific conditions.

In order to provide a keyboard that is more easily portable, some manufacturers have developed a foldable keyboard. The foldable keyboard typically includes a base support where are defined connecting zones that correspond to spacing intervals adequately disposed within the arrangement of the key locations. A circuit board made of foldable material and keypads then are adequately disposed at the connecting zones and key locations, respectively. A substrate made of foldable material is further typically attached on a bottom surface of the base support. The periphery of the foldable substrate is further provided with a protective frame having recesses and protrusion structures that connect to one another. With the above structure, the foldable keyboard can be folded to reduce its space occupation. However, after being folded, the foldable keyboard is thicker and cannot be easily placed in a bag to be carried. Moreover, once the foldable keyboard is unfolded, the bottom surface of the base support does not have any effective support structures at the folding locations. As a result, when the foldable keyboard is used for typing, it easily rocks around the connecting zones. The foldable keyboard is therefore easily leveled, which renders typing uncomfortable.

Membrane keyboards are principally made of flexible substrates. The membrane keyboards can be therefore arranged in a convenient form by direct folding or rolling. However, a major inconvenient of membrane keyboards is that their utilization is difficult when the working surface on which is placed the membrane keyboard is leveled, in which case the membrane keyboard cannot be stabilized in an adequate position for typing.

Besides the above functional considerations, aesthetic variations of conventional keyboards are also limited and not fashionable, and the external aspect of the keyboard keys is usually uniform.

SUMMARY OF THE INVENTION

A principal objective of the invention is therefore to solve the above problems by arranging a membrane keyboard in a housing assembly so that the membrane keyboard can be used on leveled working surfaces. The housing assembly is further separable to be easily fashionable.

In accordance with the above and other objectives, the housing assembly for membrane keyboard comprises an upper cover, a pressing layer disposed on the upper cover, and a base support. The membrane support is arranged between the pressing layer and the base support. An image layer can be further placed between the pressing layer and the membrane keyboard. A plurality of key zones are defined on the pressing layer corresponding to the locations of a plurality of pressing labels defined on the membrane keyboard.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention and, incorporated herein, constitute a part of the invention disclosure. A brief introduction of the drawings, which are given by way of illustration only, and thus are not limitative of the present invention, is as follows.

DESCRIPTION OF THE PREFERRED EMBODIMENTS

Figure 1:
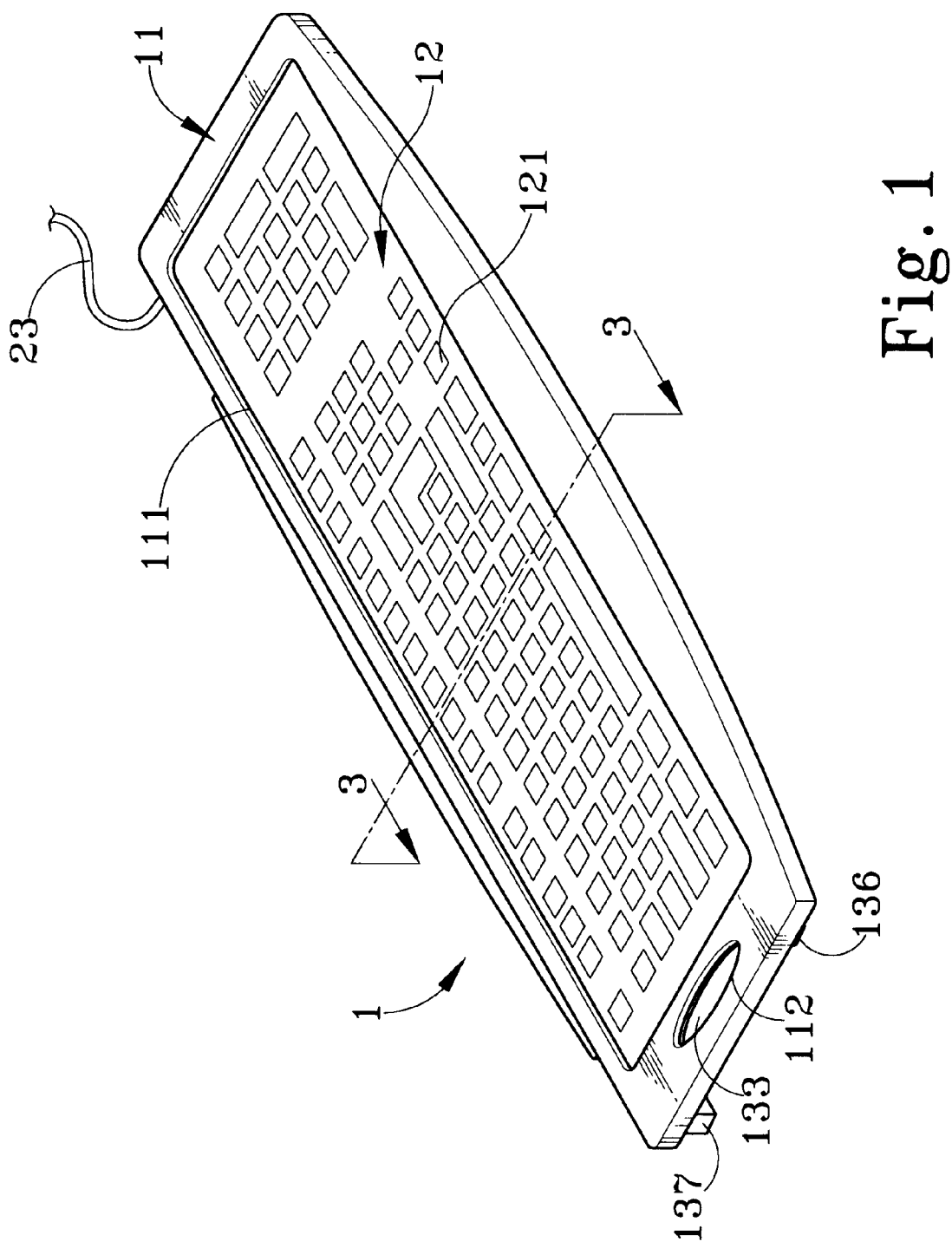
FIG. 1 is an external perspective view of the invention.
Figure 2:
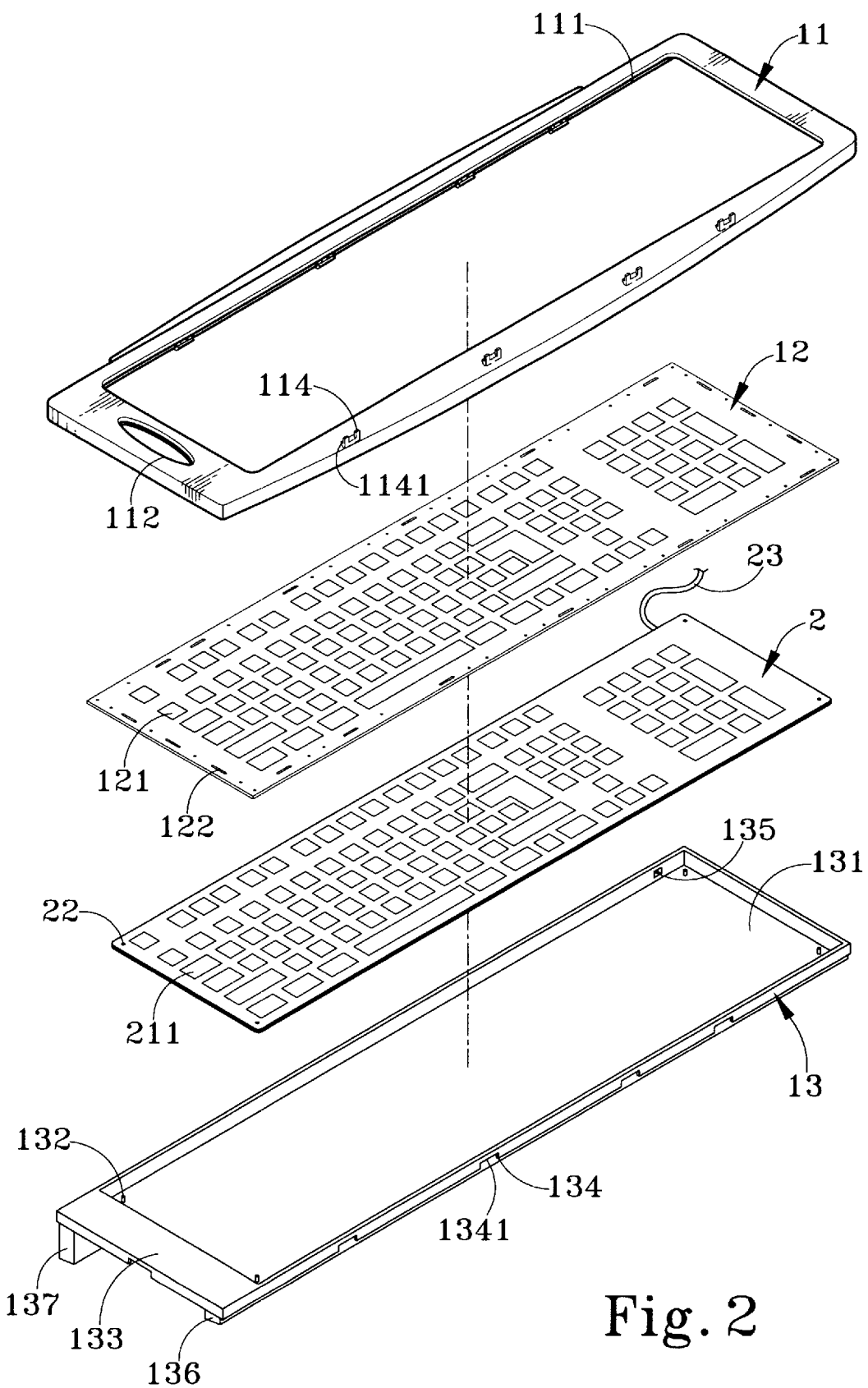
FIG. 2 is a perspective exploded view of the invention.
Figure 3:
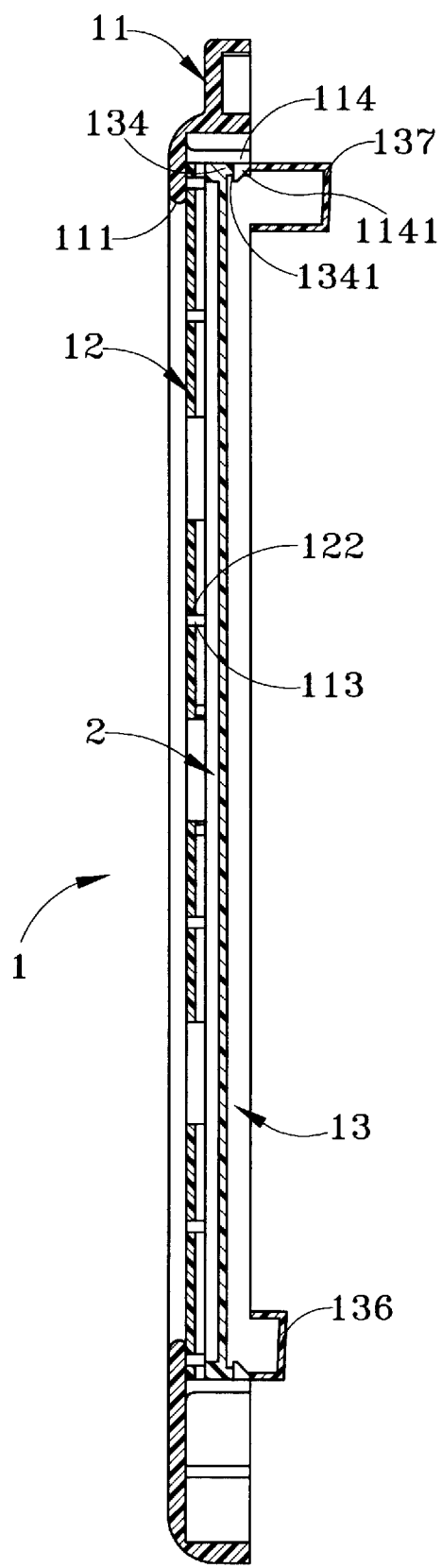
FIG. 3 is a cross-sectional view taken along the section 3—3 of FIG. 1.

A detailed description of the invention is now illustrated with reference to FIG. 1 through FIG. 3 that show various views of an embodiment of the invention. FIG. 1 is an external perspective view of the invention, FIG. 2 is a perspective exploded view of the invention, and FIG. 3 is a cross-sectional view taken along the section 3—3 of FIG. 1. As shown in FIG. 1 through FIG. 3, an objective of the invention is principally to assemble a membrane keyboard 2 in a housing assembly 1.

The housing assembly 1 comprises an upper cover 11, a pressing layer 12 that is mounted on the upper cover 11, and a base support 13. The upper cover 11 includes a cavity that defines a keyboard zone 111, and a push hole 112. A plurality of first finger elements 113 are disposed on a bottom surface of the upper cover 11 along a boundary of the keyboard zone 111. A plurality of first attachment parts 114 are disposed on the bottom surface of the upper cover 11 along a boundary of the upper cover 11. Each first attachment part 114 is an attachment tongue 1141.

The pressing layer 12 is fabricated from a substantially transparent material. A surface of the pressing layer 12 is printed with a plurality of key zones 121. A plurality of first holes 122 are further formed along a boundary of the pressing layer 12 corresponding to the locations of the first finger elements 113 of the upper cover 11, which thereby enables a mount of the upper cover 11 with the pressing layer 12.

The base support 13 has respectively a receiving zone 131 into which the membrane keyboard 2 is placed, and a push pad 133 corresponding to the location of the push hole 112 of the upper cover 11. A plurality of second finger elements 132 are further disposed at four boundary sides of the receiving zone 131 so that the membrane keyboard 2, via second holes 22 engaging the second finger elements 132, can be thereby positioned and mounted into the receiving zone 131. The base support 13 is further provided with a plurality of second attachment parts 134 that are disposed along a boundary of the base support 13 corresponding to the locations of the first attachment parts 114 of the upper cover 11. Furthermore, a wire-receiving slot 135 is placed on one side of the base support 13 for insertion of a signal wire 23 of the membrane keyboard 2. Each second attachment part 134 is a transversal rib 1341 into which one attachment tongue 1141 can engage to fasten the upper cover 11 with the base support 13. A bottom surface of the base support 13 is further provided with a first and second leveling pad 136, 137 that are laterally disposed on a front and rear portion of the bottom surface of the base support 13, respectively. In order to have an optimal inclination of the keyboard for comfortable typing, the second leveling pad 137 of the rear portion is higher than the first leveling pad 136 of the front portion.

Additionally, a surface 21 of the membrane keyboard 2 is printed with pressing labels 211 that are shaped correspondingly to the key zones 121 of the pressing layer is 12.

With the membrane keyboard 2 hence assembled within the housing assembly 1, the membrane keyboard 2 can be therefore used on leveled working surfaces.

Figure 4:
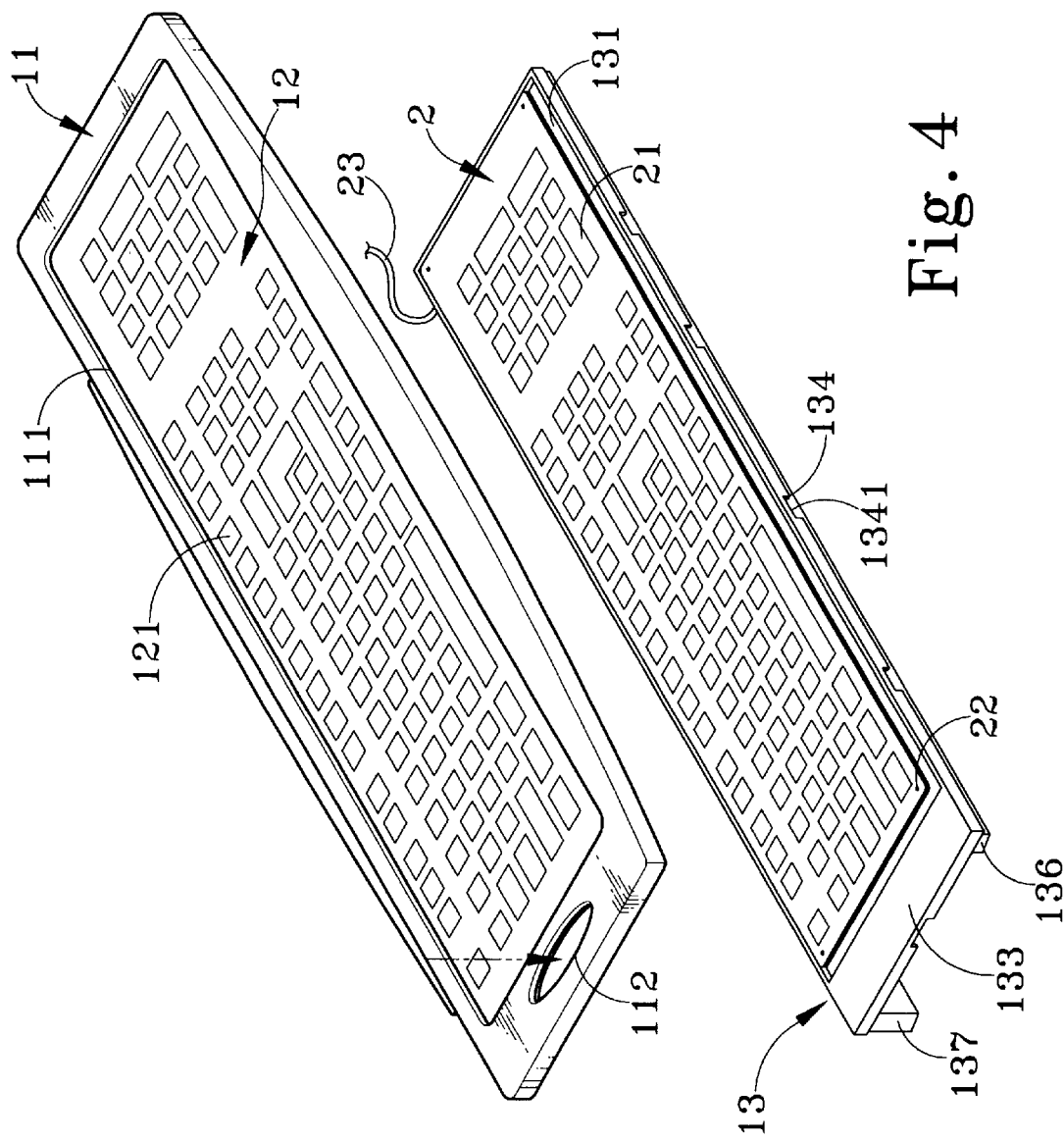
FIG. 4 is a perspective view schematically illustrating a separation operation of the housing assembly according to the invention.

Referring to FIG. 4, a perspective view schematically illustrates a separation operation of the housing assembly according to the invention. When the user wants to change or clean the upper cover 11, or directly use the membrane keyboard 2, the user only has to push on the push pad 133 of the base support 13 that is exposed through push hole 112 of the upper cover 11. The attachment tongues 1141 of the upper cover 11 thereby disengage from the ribs 1341, which separate the upper cover 11 from the base support 13. Then, the user can either change or cleaning the upper cover 11, or directly uses the membrane keyboard 2.

Figure 5:
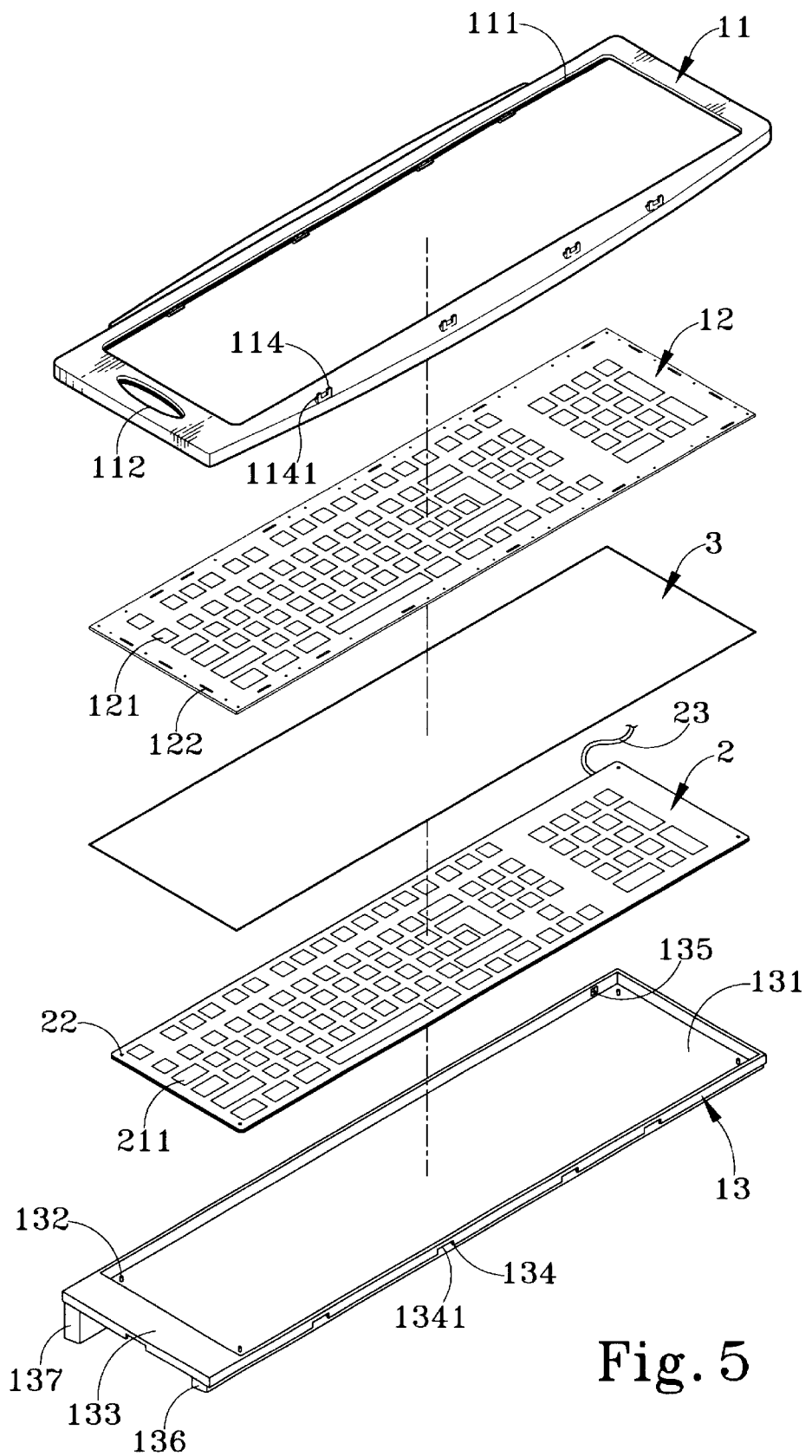
FIG. 5 is a perspective and exploded view schematically showing another embodiment of the invention.

Referring to FIG. 5, a perspective and exploded view schematically shows another embodiment of the invention. As shown in FIG. 5, in order to improve an aesthetic aspect and/or provide a publicity support, an image layer 3 may be disposed between the pressing layer 12 and the membrane keyboard 2. The image layer 3 may be printed with various features, advertisements, or trademarks as background. The image layer may also be printed with luminous features that, additionally to providing a convenient manipulation in darkness condition, can also increase the aesthetic aspect of the membrane keyboard 2.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A housing assembly in which is placed a membrane keyboard, comprising:

an upper cover including a keyboard zone of the upper cover;

a base support fastened with the upper cover, wherein the base support includes a receiving-zone into which is placed the membrane keyboard, and a push pad corresponding to the location of the push hole of the upper cover, whereby the membrane keyboard is stabilized on leveled working surfaces for comfortable typing; and an image layer having image features placed between the pressing layer and the membrane keyboard.

2. The housing assembly of claim 1, wherein a plurality of first finger elements are disposed on a bottom surface of the upper cover along a boundary of the keyboard zone, and a plurality of first holes are disposed along a boundary of the pressing layer corresponding to the locations of the first finger elements, whereby the pressing layer is assembled with the upper cover, wherein a plurality of first and second attachment parts are further respectively disposed on the bottom surface of the upper cover and along a boundary of the base support.

3. The housing assembly of claim 1, wherein a wire-receiving slot is further arranged on the base support to receive a signal wire of the membrane keyboard, a plurality of second finger elements are disposed at four boundary sides of the receiving zone of the base support, and a plurality of second holes are formed at four boundary sides of the membrane keyboard, whereby the membrane keyboard is fixedly attached to the base support.

4. The housing assembly of claim 1, further comprising first and second attachment parts, the first attachment parts being on the upper cover and including attachment tongues, and the second attachment parts being on the base support and including transversal ribs, whereby the upper cover fastens with the base support by engaging the attachment tongues into the transversal ribs.

5. The housing assembly of claim 4, wherein the pressing layer is made of substantially transparent material, and a surface of the pressing layer is printed to correspond with a plurality of key zones.

6. The housing assembly of claim 1, wherein the bottom surface of the base support is further provided with a first and second leveling pad that are laterally disposed on a front and a rear portion of the bottom surface of the base support, wherein the second leveling pad of the rear portion is higher than the first leveling pad of the front portion.

7. The housing assembly of claim 1, wherein a plurality of pressing labels are directly printed on a surface of the membrane keyboard.

8. The housing assembly of claim 1, wherein the image features include images, advertisement images or trademarks as background.

9. The housing assembly of claim 1, wherein the image is printed with luminous features so that typing can be performed in darkness conditions.

* * * * *